United States Patent

Heminger et al.

(10) Patent No.: US 6,744,034 B2
(45) Date of Patent: *Jun. 1, 2004

(54) MICRO-ELECTROMECHANICAL APPARATUS AND METHOD WITH POSITION SENSOR COMPENSATION

(75) Inventors: Mark David Heminger, Rochester, MN (US); Robert Edward Jansen, Byron, MN (US)

(73) Assignee: Texas Instruments Incorporated, Dallas, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/060,936

(22) Filed: Jan. 30, 2002

(65) Prior Publication Data

US 2003/0141439 A1 Jul. 31, 2003

(51) Int. Cl.[7] .................................................. G01J 1/32
(52) U.S. Cl. ........................................ 250/221; 250/205
(58) Field of Search ............................ 250/201.1, 205, 250/221, 214 R, 214 C, 234; 359/838, 871, 872, 877

(56) References Cited

U.S. PATENT DOCUMENTS

| | | | | | |
|---|---|---|---|---|---|
| 3,783,277 A | * | 1/1974 | Younkin et al. | ............. | 250/205 |
| 3,898,583 A | * | 8/1975 | Shuey | ......................... | 250/205 |
| 3,949,226 A | * | 4/1976 | Dugan et al. | ................ | 250/205 |
| 4,273,999 A | * | 6/1981 | Pierpoint | ..................... | 250/205 |
| 4,275,296 A | * | 6/1981 | Adolfsson | ..................... | 250/205 |
| 4,342,906 A | * | 8/1982 | Hyatt | .......................... | 250/205 |
| 4,598,197 A | * | 7/1986 | Morita et al. | ................ | 250/205 |
| 4,598,586 A | * | 7/1986 | Danielson | ..................... | 250/205 |
| 4,647,981 A | * | 3/1987 | Froelich | ....................... | 250/578 |
| 4,650,332 A | * | 3/1987 | Muraoka et al. | ............. | 250/205 |
| 4,879,459 A | * | 11/1989 | Negishi | ........................ | 250/205 |
| 4,965,444 A | * | 10/1990 | Howe | .......................... | 250/205 |
| 5,489,771 A | * | 2/1996 | Beach et al. | ................ | 250/205 |
| 5,693,931 A | * | 12/1997 | Wade | .......................... | 250/205 |
| 5,726,437 A | * | 3/1998 | Ashikaga et al. | ........... | 250/205 |
| 5,734,170 A | * | 3/1998 | Ikeda | .......................... | 250/205 |
| 5,753,903 A | * | 5/1998 | Mahaney | ..................... | 250/205 |
| 6,262,407 B1 | * | 7/2001 | Teder | .......................... | 250/205 |
| 6,295,154 B1 | * | 9/2001 | Laor et al. | ................... | 259/223 |
| 6,490,302 B1 | * | 12/2002 | Koishi et al. | ............... | 250/205 |
| 2002/0070335 A1 | * | 6/2002 | Orcutt et al. | ............... | 250/234 |
| 2002/0186917 A1 | * | 12/2002 | Kalinowski | .................. | 359/128 |

FOREIGN PATENT DOCUMENTS

| | | | | | |
|---|---|---|---|---|---|
| JP | 56133714 A | * | 10/1981 | ................. | 250/205 |
| JP | 63282606 A | * | 11/1988 | ................. | 250/205 |

* cited by examiner

Primary Examiner—Diego Gutierrez
Assistant Examiner—Mirellys Jagan
(74) Attorney, Agent, or Firm—William B. Kempler; W. James Brady, III; Frederick J. Telecky, Jr.

(57) ABSTRACT

Micro-electromechanical apparatus and method with position sensor compensation to compensate for sensor drift. A preferred embodiment comprises modifying the intensity of a light source used in position detection to maintain a constant sum of the voltages output from photodetectors receiving light from the light source. Preferred embodiments may be implemented in digital signal processor code, or external to the processor in analog circuitry. By adjusting light source intensity, position calculations may be performed without normalization, and thus without a time-consuming division operation.

20 Claims, 6 Drawing Sheets

MICRO-ELECTROMECHANICAL APPARATUS AND METHOD WITH POSITION SENSOR COMPENSATION

CROSS-REFERENCE TO RELATED APPLICATIONS

This application is related to the following co-pending and commonly assigned patent applications: Ser. No. 09/957,476, filed Sep. 20, 2001, entitled PACKAGED MICROMIRROR ASSEMBLY WITH IN-PACKAGE MIRROR POSITION FEEDBACK; Ser. No. 09/955,539, filed Sep. 18, 2001, entitled STACKED MICROMIRROR STRUCTURES; and Ser. No. 09/955,506, filed Sep. 18, 2001, entitled MOLDED PACKAGES FOR OPTICAL WIRELESS NETWORK MICROMIRROR ASSEMBLIES; which applications are hereby incorporated herein by reference.

TECHNICAL FIELD

The present invention relates generally to a micro-electromechanical apparatus and method, and more particularly to a micro-electromechanical apparatus and method with position sensor compensation.

BACKGROUND

In recent years optical systems have come into widespread use in a wide variety of applications. In wired systems, optical signals are transmitted along optical fibers and switched from one fiber to another with some type of switch. In one prior art switching method, an optical signal received on an optical fiber may be converted into an electrical signal, switched in the electrical domain, and then converted back into an optical signal for transmission on a different optical fiber.

In order to avoid these optical domain-electrical domain conversions, another prior art switching method mechanically positions the end of an optical fiber in one fiber group so as to point toward the end of another optical fiber in another fiber group. While this method keeps the signal in the optical domain, it generally requires a fairly complex and relatively slow positioning and alignment mechanism that is duplicated for each fiber in a group. There is thus a need for an optical steering device that keeps the signal in the optical domain, but does not have the problems associated with the fiber-positioning apparatus.

In another optical application, a wireless network may be implemented that does not use a physical wire for transmission of the light signal. Data is transmitted through the modulation of a light beam, in much the same manner as wired fiber optic communications. A photoreceiver receives the modulated light and demodulates the signal to retrieve the data. In the case of directed optical communications, a line-of-sight relationship between the transmitter and the receiver permits the light beam to travel without a fiber optic waveguide. Such a wireless system may be used for inter-device communication within a small room, for a local network within a building or between buildings, or for an external network.

The proper functioning of a wireless system generally relies on the ability to correctly aim the transmitted light beam to the receiver. For example, a laser-generated collimated beam can have a small spot size, and the reliability and signal-to-noise ratio of the transmitted signal are degraded if the aim of the transmitting beam strays from the optimum point at the receiver. There is thus a need for an optical steering device that can precisely position a light beam on a target receiver, and keep it on the receiver under changing conditions.

Laor et al., U.S. Pat. No. 6,295,154, issued Sep. 25, 2001, entitled OPTICAL SWITCHING APPARATUS," commonly assigned herewith and incorporated herein by reference, discloses a micro-electromechanical ("MEM") movable mirror assembly that may be used to alleviate the above problems in wired and wireless optical applications. As described in detail in Laor et al., with respect to a wired system, a micromirror is positioned relative to optical fibers so that it may direct optical signals from a fiber to one or more different optical fibers. This apparatus may also be used to direct and align a wireless optical signal between a transmitter and a receiver.

The micromirror generally is rotatable about two axis and is driven magnetically using some combination of permanent magnets and electromagnetic coils. The micromirror reflects the light signal in a manner that may be precisely controlled by the electrical signals sent to the electromagnetic coils. Because analog signals are used to control the coils, the mirror's position is generally continuously variable over its range of motion. The precise positioning of the micromirror is generally accomplished by way of calibration and feedback, so that the optical system is able to sense the mirror's position and make corrections.

Copending application Ser. No. 09/957,476, filed Sep. 20, 2001, entitled PACKAGED MICROMIRROR ASSEMBLY WITH IN-PACKAGE MIRROR POSITION FEEDBACK, discloses a micromirror apparatus with micromirror position sensing implemented into the apparatus. As disclosed in detail in the copending application, underlying the mirror is a sensor for sensing the angular position of the mirror. In one embodiment, the sensor includes a light-emitting diode ("LED") and angularly spaced light sensors (preferably four, one in each quadrant) that can sense the intensity of light emitted by the diode and reflected from the backside of the mirror. The position of the mirror may be derived from a comparison of the intensities sensed by the various angularly positioned light sensors. This calculation is generally performed by a digital signal processor ("DSP") or general purpose microprocessor which is controlling the mirror's position.

One potential problem with using an LED for position feedback is that the output from the photodetectors is a function not only of the position of the mirror, but also of the LED intensity and detector sensitivity, with are both generally a function of temperature and, to a lesser extent, time. Generally, this will introduce drift into the feedback signals (the voltage outputs from the photodetectors), causing the indicated position of the mirror to drift as well. One method of compensating for this drift is to divide each position calculation by the sum of the voltages output by the detectors. A disadvantage of this method, however, is that the processor is performing mirror positioning in real time, and division is a time-consuming operation, generally taking many clock cycles to complete. Thus, the processor may not be able to compensate for LED intensity and detector sensitivity drift, and still control micromirror positioning in real time.

SUMMARY OF THE INVENTION

These and other problems are generally solved or circumvented, and technical advantages are generally achieved, by preferred embodiments of the present invention in which position sensor compensation is performed without using valuable processor resources to perform a time-consuming division operation. Generally, in preferred embodiments, instead of using division in the position calculation to compensate for changes in LED intensity and detector sensitivity, the intensity of the LED is modified by the controller to maintain a constant sum of the voltages output from the photodetectors.

Preferred embodiments of the invention may be implemented in either software in the processor or in an analog circuit tied into the feedback loop. In a preferred embodiment, the sum of the four sensor voltages is monitored and compared to a desired set point. If the sum is below the set point, the LED intensity is increased, and if the sum is above the set point, the LED intensity is decreased. The sum of the four sensor outputs is thus maintained at a constant voltage (the set point value) over time.

In accordance with a preferred embodiment of the present invention, a micro-electromechanical apparatus comprises an actuator element, a light source for illuminating a portion of the actuator element, a plurality of detectors for detecting a light intensity from the light source after reflection from the portion of the actuator element, wherein the light intensity detected at the plurality of detectors is representative of an orientation of the actuator element, and control circuitry for sending an intensity level signal to the light source and for receiving voltage signals from the plurality of detectors proportional to the intensity of the detected light. The control circuitry comprises a summer for adding the voltage signals to generate a voltage sum, and a comparator for comparing the voltage sum to an light intensity setpoint. The control circuitry adjusts the intensity level signal based on the voltage sum to light intensity setpoint comparison.

In accordance with another preferred embodiment of the present invention, a method of compensating for position sensor drift in a micromirror device comprises providing a light intensity level signal to a light source, directing light proportional to the light intensity level signal at an underside of a micromirror, detecting light reflected from the underside of the micromirror with a plurality of photodetectors, generating voltage signals representative of the reflected light detected with the plurality of photodetectors, summing the voltage signals to generate a voltage sum, comparing the voltage sum to a light intensity setpoint, and adjusting the light intensity level signal based on the voltage sum to light intensity setpoint comparison.

In accordance with another preferred embodiment of the present invention, a micromirror apparatus comprises a mirror element, a light source for illuminating a portion of an underside of the mirror element, a plurality of detectors outputting voltage signals representative of a light intensity detected from the light source after reflection from the underside of the mirror element, wherein the voltage signals are representative of an orientation of the mirror element, and sensor control circuitry for sending a light intensity signal to the light source and for receiving the voltage signals from the plurality of detectors. The control circuitry comprises a summer for adding the voltage signals to generate a voltage sum, and a comparator for comparing the voltage sum to an light intensity setpoint. The control circuitry adjusts the light intensity signal based on the voltage sum to light intensity setpoint comparison.

An advantage of a preferred embodiment of the present invention is that changes in LED intensity and detector sensitivity may be compensated for in an analog micromirror apparatus, providing more accurate micromirror positioning.

Another advantage of a preferred embodiment of the present invention is that position sensor compensation may be performed without a division operation.

Another advantage of a preferred embodiment, in which the compensation calculation is performed by the controlling processor, is that the compensation is not part of the position calculation, and therefore the calculations may be performed in non-critical time periods apart from the direct position measurement/control operation.

Another advantage of a preferred embodiment of the present invention is that when the compensation is performed by analog circuitry, the controlling processor generally is not required to perform any compensation calculations.

A further advantage of a preferred embodiment of the present invention, in which the compensation is performed by analog circuitry, is that the set point may be adjusted once, and then generally does not need to be updated. In addition, an analog implementation may allow a coarser, less expensive digital-to-analog converter ("DAC") to be used for setting the set point, because the analog circuitry will provide any fine adjustments to the set point.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an analog micromirror apparatus used in an optical wireless network. The invention may also be applied, however, to other data transfer applications, such as providing switching or add/drop multiplexing in an optical wired network. In addition, the invention may be applied to other positioning systems and apparatuses, such as MEM devices having position measurement.

Figure 1:
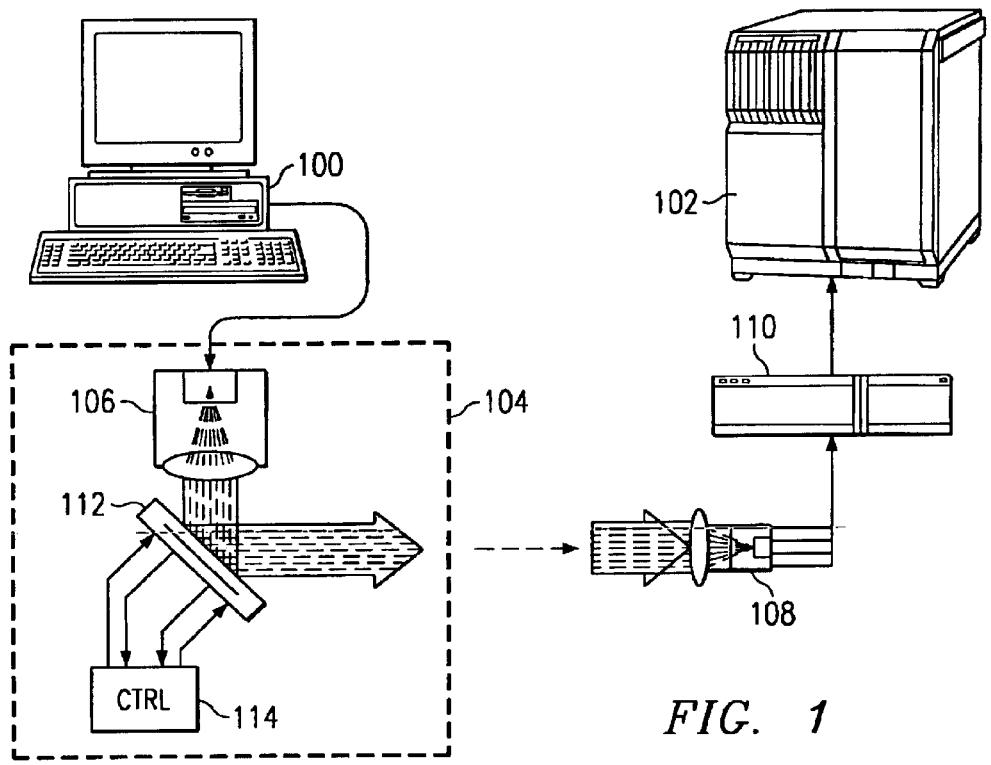
FIG. 1 is a block diagram of an optical system utilizing a micromirror apparatus.

With reference now to FIG. 1, there is shown an example of an optical wireless network. The network, as well as other applications for the micromirror apparatus, and the micromirror apparatus itself, are described in detail in copending application Ser. No. 09/957,476, filed Sep. 20, 2001, entitled PACKAGED MICROMIRROR ASSEMBLY WITH IN-PACKAGE MIRROR POSITION FEEDBACK. They are briefly described herein to provide context for the preferred embodiments of the present invention. Optical communications are carried out between computer 100 and server 102. Computer 100 is connected to optical transmitter module 104, which generates a laser light beam with laser 106, modulates the light beam to communicate data, and aims the light beam at optical receiver module 108. Receiver module 108 may include a photodiode that modulates an electrical signal in response to the detected light beam. The demodulated electrical signal is sent to router 110 for distribution to server 102.

Transmitter module 104 contains analog micromirror device 112, which is used to precisely aim the modulated light beam at receiver 108, in order to optimize the signal-to-noise ratio of the transmitted signal. This precise positioning is accomplished by way of calibration and feedback, so that the mirror is able to sense its position and make corrections. Micromirror apparatus 112 includes integral position sensing capability for detecting the orientation of the mirror and generating a signal that is applied to control circuit 114. In response, control circuit 114 provides electrical signals to micromirror apparatus 112 to position the mirror, so that the light beam may impinge receiver 108 in an optimal manner.

Figure 2A:
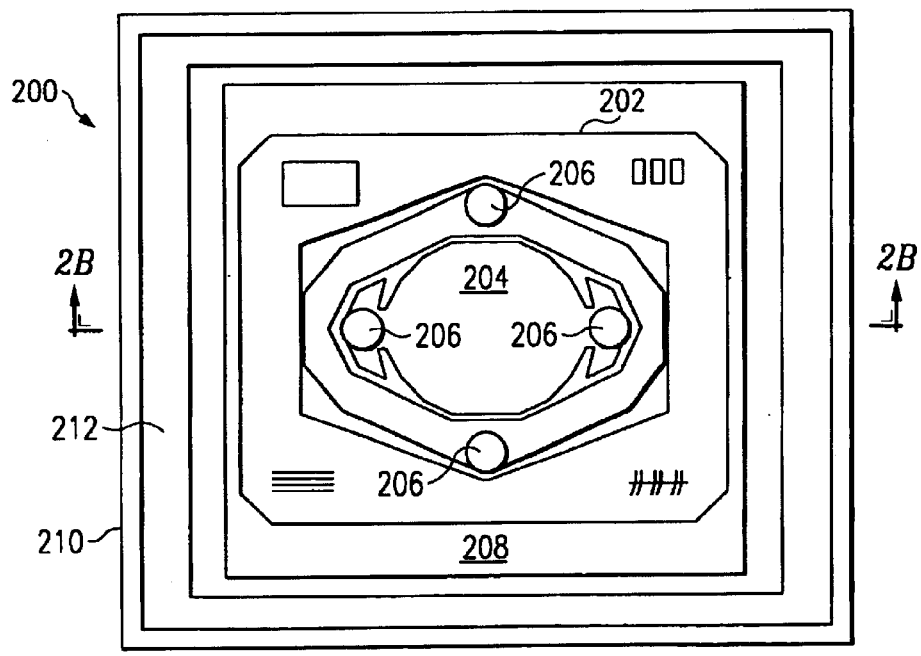
FIGS. 2A and 2B are plan and cross-sectional views, respectively, of a micromirror apparatus.
Figure 2B:
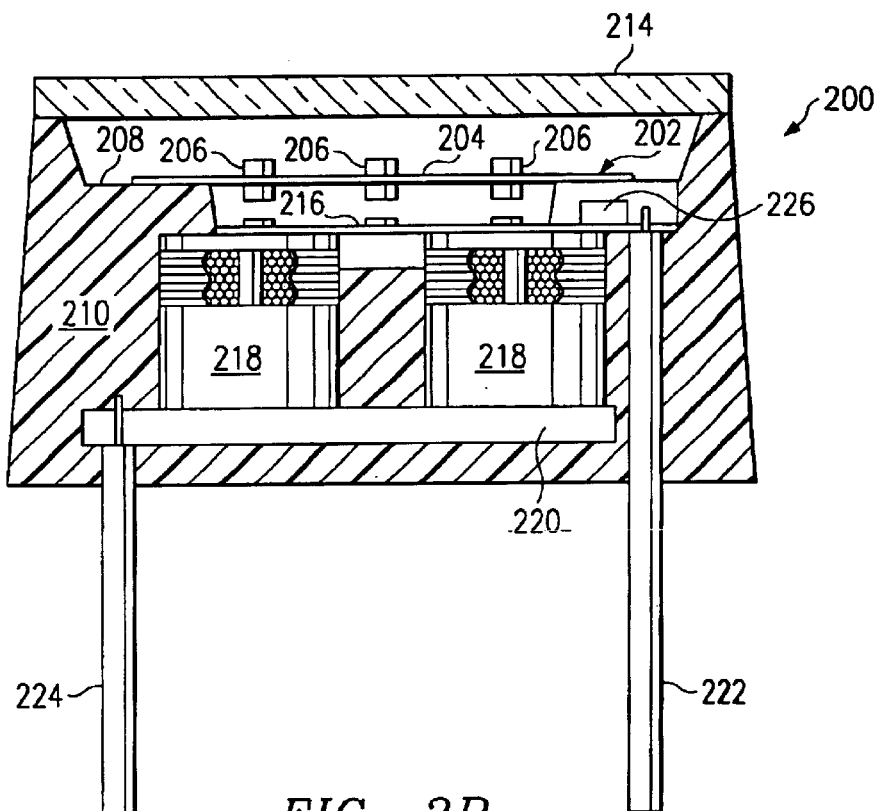

Referring now to FIGS. 2A and 2B, there is shown an analog micromirror apparatus 200. Mirror element 202 is formed of a single piece of material, preferably single-crystal silicon, photolithographically etched in the desired pattern to form mirror surface 204 and its supporting hinges and frame. Four permanent magnets 206 are attached to mirror element 202, at a 90° relative orientation from one another. Mirror element 202 is attached to shelf 208 of body 210. Shelf 208 lies inwardly of window shelf 212, upon which transparent window 214 is attached. Position sensor 216 is disposed between mirror element 202 and driver coil 218, which is mounted on base 220. Position sensor 216 is electrically connected to leads 222 to provide position-related signals to control circuitry 114 shown in FIG. 1. Position input signals are received from control circuitry 114 on leads 224. Memory 226 may be provided for storing calibration data for position sensor 216.

Figure 3A:
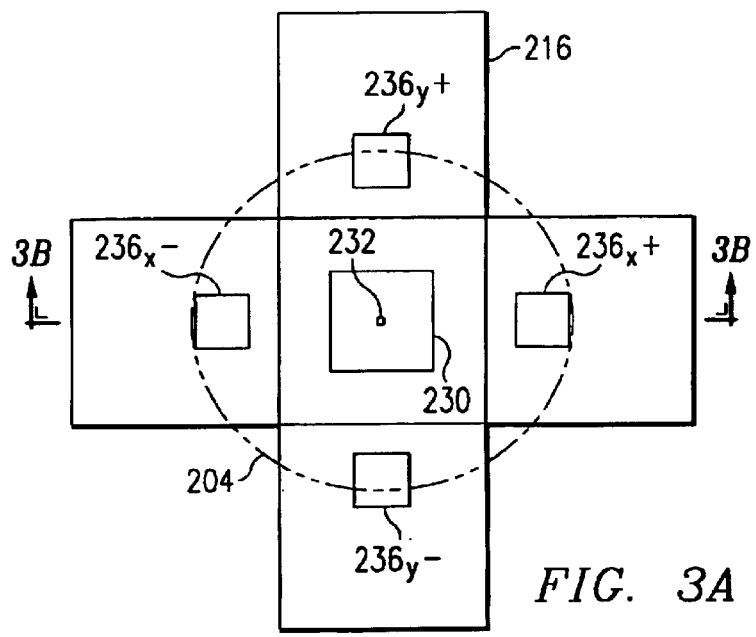
FIGS. 3A and 3B are plan and cross-sectional views, respectively, of a micromirror apparatus.
Figure 3B:
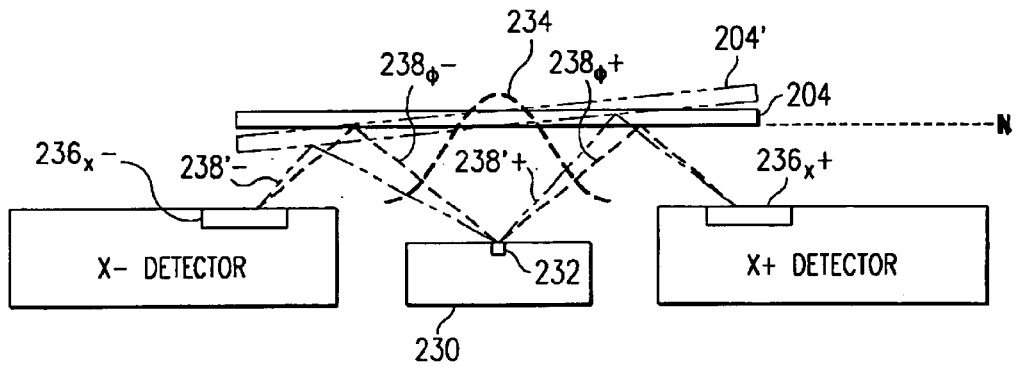

Referring now to FIGS. 3A and 3B, there is shown a more detailed view of the components of the position sensing mechanism. Position sensor 216 comprises a printed circuit board having LED 230 that emits light through point aperture 232 toward the underside of mirror 204, providing light distribution 234 that is essentially Gaussian in shape, which distribution is used to calculate the position of mirror 204. Position sensor 216 also comprises four photodetectors 236$x$+, 236$x$−, 236$y$+ and 236$y$−, preferably spaced at the same radial distance from aperture 232.

In operation, sensor 216 detects changes in the orientation of mirror 204 from variations in the light intensity sensed by detectors 236. FIG. 3B shows the measurement of rotation about one axis for clarity of description; measurement of the rotation about the other axis is functionally similar. In the null or flat position, represented by mirror 204 in FIG. 3B, the light is reflected off the underside of mirror 204 at substantially the same angle relative to normal, as shown by paths $238_{0+}$ and $238_{0-}$ to sensors 236$x$+ and 236$x$−, respectively. Thus, at this mirror position, substantially equal light intensity is sensed by detectors 236$x$+ and 236$x$−.

Upon rotation of mirror 204 to rotated position 204', detectors 236$x$+ and 236$x$− will sense different magnitudes of light intensity due to the change in the paths traveled by the emitted light. Due to the Gaussian light distribution 234, detector 236$x$− will receive lower intensity reflected light because the light travels along path 238'−, which is at an angle farther from normal than when in the null position. On the other hand, detector 236$x$+ will receive higher intensity reflected light because the light travels along path 238'+, which at an angle closer to normal than when in the null position.

Figure 4:
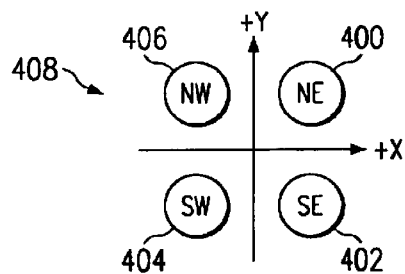
FIG. 4 is a plan view of a position sensor configuration for a micromirror apparatus.

Detectors 236 generate electrical signals indicative of the intensity of detected light, which signals may be used by controller 114 to determine the rotational position of mirror 204. Referring to FIG. 4, there is shown a graphical representation of the four sensors, NE sensor 400, SE sensor 402, SW sensor 404, and NW sensor 406, one in each quadrant of X-Y plane 408. The mirrors are mounted along the diagonal axes of the mirror motion. The uncompensated measured positions in X and Y are given by the formulas:

$$PosX = (V_{NE} + V_{SE} - V_{SW} - V_{NW}) * GainX + OffsetX$$

$$PosY = (V_{NE} - V_{SE} - V_{SW} + V_{NW}) * GainY + OffsetY$$

In these formulas, the appropriate sensor voltages are added and subtracted to isolate the respective axis, the total is multiplied by a gain factor, and then an offset is added to derive a final position determination. The values for the gain and offset may be derived by tilting the mirror to a known position, measuring the indicated position, and then tilting the mirror to another known position, measuring the indicated position, and then using those measurements to calculate the gain and offset. Alternatively, other methods may be used, such as measuring the voltages at more than two points using a least squares fit algorithm to arrive at the gain and offset values.

As described hereinabove, this uncompensated position measurement is affected by sensor drift caused by changes in LED intensity and detector sensitivity. For example, if the LED intensity decreases by a factor of two, the position measurements will provide an incorrect value for the mirror's true position. To compensate for sensor drift, the voltage measurements may be divided by the sum of the voltages as follows:

$$Sum = V_{NE} + V_{SE} + V_{SW} + V_{NW}$$

$$PosX = ((V_{NE} + V_{SE} - V_{SW} - V_{NW})/Sum) * GainX + OffsetX$$

$$PosY = ((V_{NE} - V_{SE} - V_{SW} + V_{NW})/Sum) * GainY + OffsetY$$

In this case, the compensated position measurement will generally provide accurate position measurements even in the presence of sensor drift. Generally, by dividing the voltage calculation by the sum of the voltages, the drift is canceled out and the position measurement is normalized. For example, if the LED intensity decreases by a factor of two, the sum of the voltages will also decrease by a factor of two, and the normalized position measurement is unchanged.

One potential problem with this approach is that it requires a division operation in the controller. Generally, a DSP can generally perform additions, subtractions and multiplications very quickly, on the order of 2–3 clock cycles. A division operation, on the other hand, may take 500 to 1,000 clock cycles, by comparison. As an example, in controlling four mirrors simultaneously for a fiber optic switching box application, there may be a total time of 200 microseconds to perform all of the control operations. In this case, over a quarter of that time may be spent performing the division operations one time per mirror.

Figure 5:
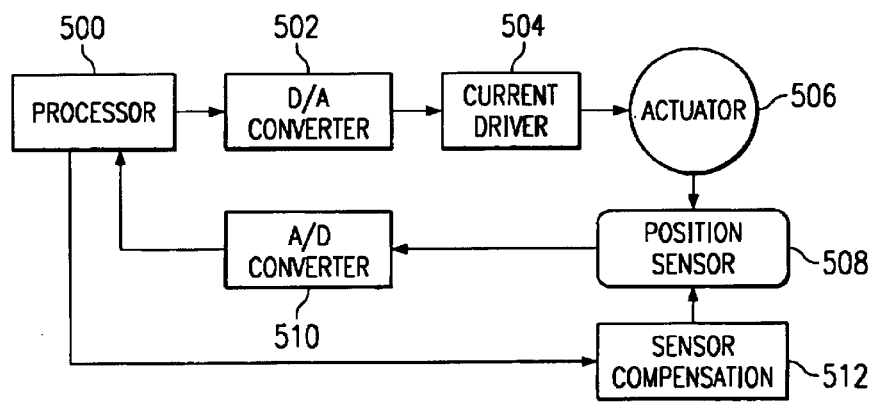
FIG. 5 is a high-level block diagram of a position control apparatus with position sensor compensation.

FIG. 5 illustrates a high-level block diagram of a position control apparatus with position feedback and sensor compensation. In accordance with a preferred embodiment of the present invention, the position sensor compensation is generally performed separate from the position calculation, and without a division operation. Processor 500 generates digital position commands that are converted to analog signals by DAC 502. The analog signals are fed into current driver 504, which generates current signals to drive actuator 506 to the commanded position. In a preferred embodiment, actuator 506 comprises coil drivers/magnets and a movable micromirror as described hereinabove, although actuator 506 may be any type of movable MEM device. Position sensor 508 measures the position of actuator 506 and generates one or more analog signals representative of the measured position. The analog position measurement is converted to a digital signal by analog-to-digital converter ("ADC") 510, which digital signal is sent to processor 500 for processing.

Correction for position sensor drift is provided by sensor compensation 512. As will be described in detail below, sensor compensation is performed by control circuitry connected to the light source and the position detectors. Sensor compensation may be performed by the processor in addition to its position control and position calculation operations, or by a dedicated analog circuit external to the processor as part of a sensor control loop. Alternatively, the sensor compensation may be performed in dedicated digital circuitry, a combination of digital and analog hardware, or a combination of hardware and software. Generally, sensor compensation is achieved by adjusting the LED drive current, and thus the LED intensity, to maintain the sum of the voltage outputs from the detectors at a constant level. This obviates the need for a division operation in the processor during its real time control operations (e.g., position calculations).

Figure 6:
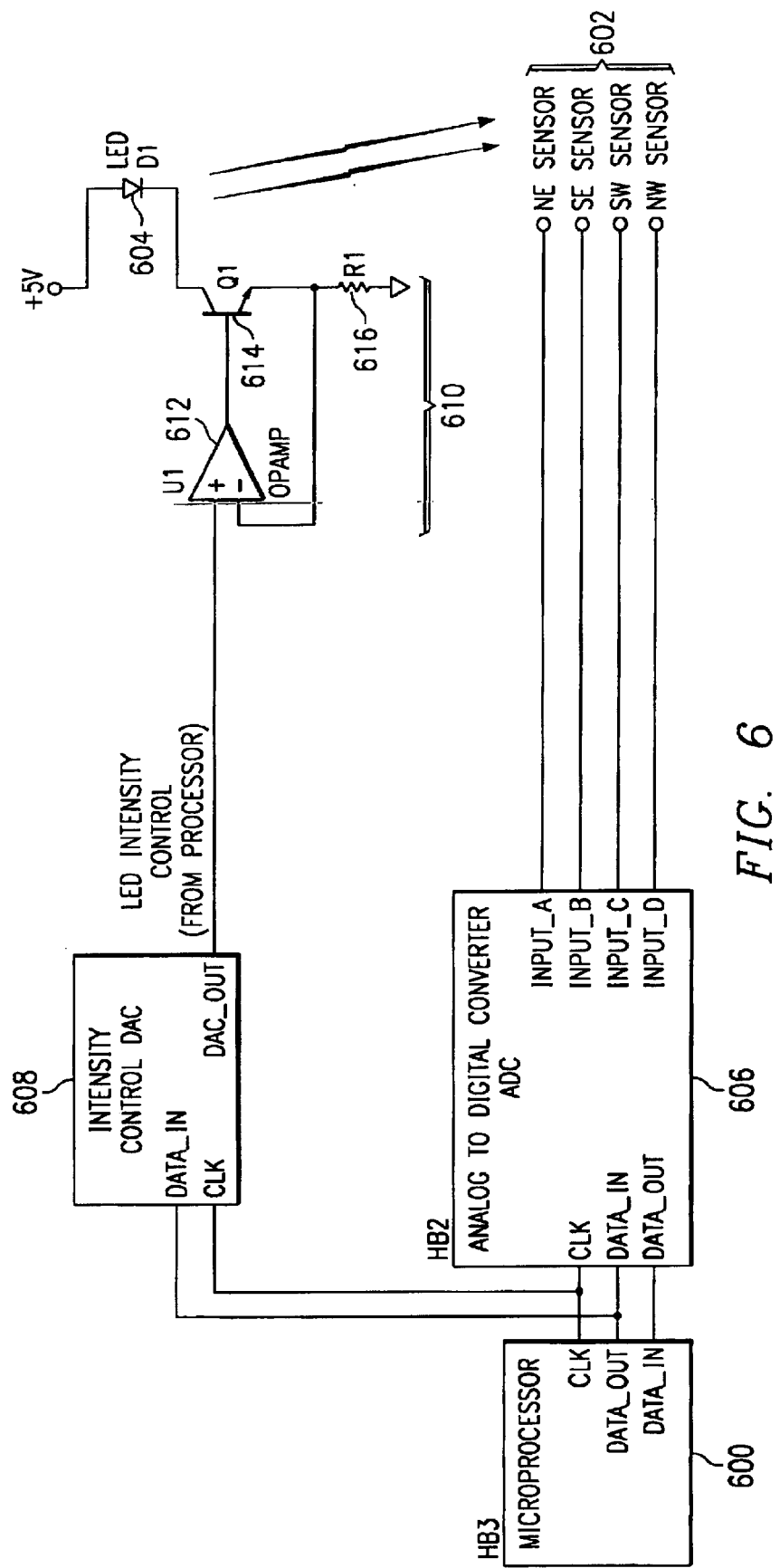
FIG. 6 is a schematic of a position control apparatus with processor-based position sensor compensation.

With reference now to FIG. 6, there is shown a circuit block diagram in which the sensor compensation is controlled by processor 600. Because the position calculation itself does not need to compensate for sensor drift, the voltage difference calculations performed by processor 600 may be the same ones as described hereinabove for the uncompensated case:

$PosX=(V_{NE}+V_{SE}-V_{SW}-V_{NW})*GainX+OffsetX$ $PosY=(V_{NE}-V_{SE}-V_{SW}+V_{NW})*GainY+OffsetY$ Processor 600 may use this information to correct for position errors, sending revised position commands to the actuator (shown in FIG. 5).

With respect to sensor drift compensation, sensors 602 generate analog voltages representative of the light received from LED 604, which light varies as the mirror is rotated. The analog voltages are converted to digital signals by ADC 606, and provided to processor 600. Processor 600 then calculates the sum of the signals as follows:

$Sum=V_{NE}+V_{SE}+V_{SW}+V_{NW}$

Instead of using this value to normalize the position calculations, processor 600 adjusts the intensity level of LED 604 based on the value of the voltage sum with respect to a setpoint, as follows:

If (Sum<Setpoint)

LED Intensity=LED Intensity+LED Step else

LED Intensity=LED Intensity−LED Step where LED Step is a fixed fraction of the total range of LED Intensity. Alternatively, instead of using a simple less than/greater than comparison of the voltage sum and the setpoint, a proportional comparison may be performed wherein the increase or decrease in LED intensity is made proportional to difference between the voltage sum and the setpoint.

The initial setpoint may be selected in a calibration step, for example, by tilting the mirror through its range of motion and adjusting the LED intensity to be just below the saturation point on each of the detectors. This generally provides a high signal to noise ratio for the sensor without saturating any detectors.

Upon reading and summing the voltages, if processor 600 determines that the voltage sum is less than the setpoint, the LED intensity is increased. Generally, this has the effect of increasing the sum of the voltages on the next reading. On the other hand, if the voltage sum is greater than the setpoint, the LED intensity is decreased, which will lower the voltage sum on the next reading. The sensor loop thus adjusts the setpoint to maintain a constant sum of the sensor output voltages.

To set or adjust the LED intensity setpoint, processor 600 outputs a digital signal to intensity control DAC 608, which converts the digital signal into an analog voltage signal. The analog signal is provided to LED drive circuit 610, which converts the voltage signal into a current signal that drives LED 604. LED drive circuit 610 is preferably a voltage-to-current converter consisting of op amp 612, drive transistor 614 and resistor 616, configured as shown in FIG. 6. Alternatively, other circuitry may be used for LED drive circuit 610, such as a voltage amplifier in series with a large value resistor.

Figure 7:
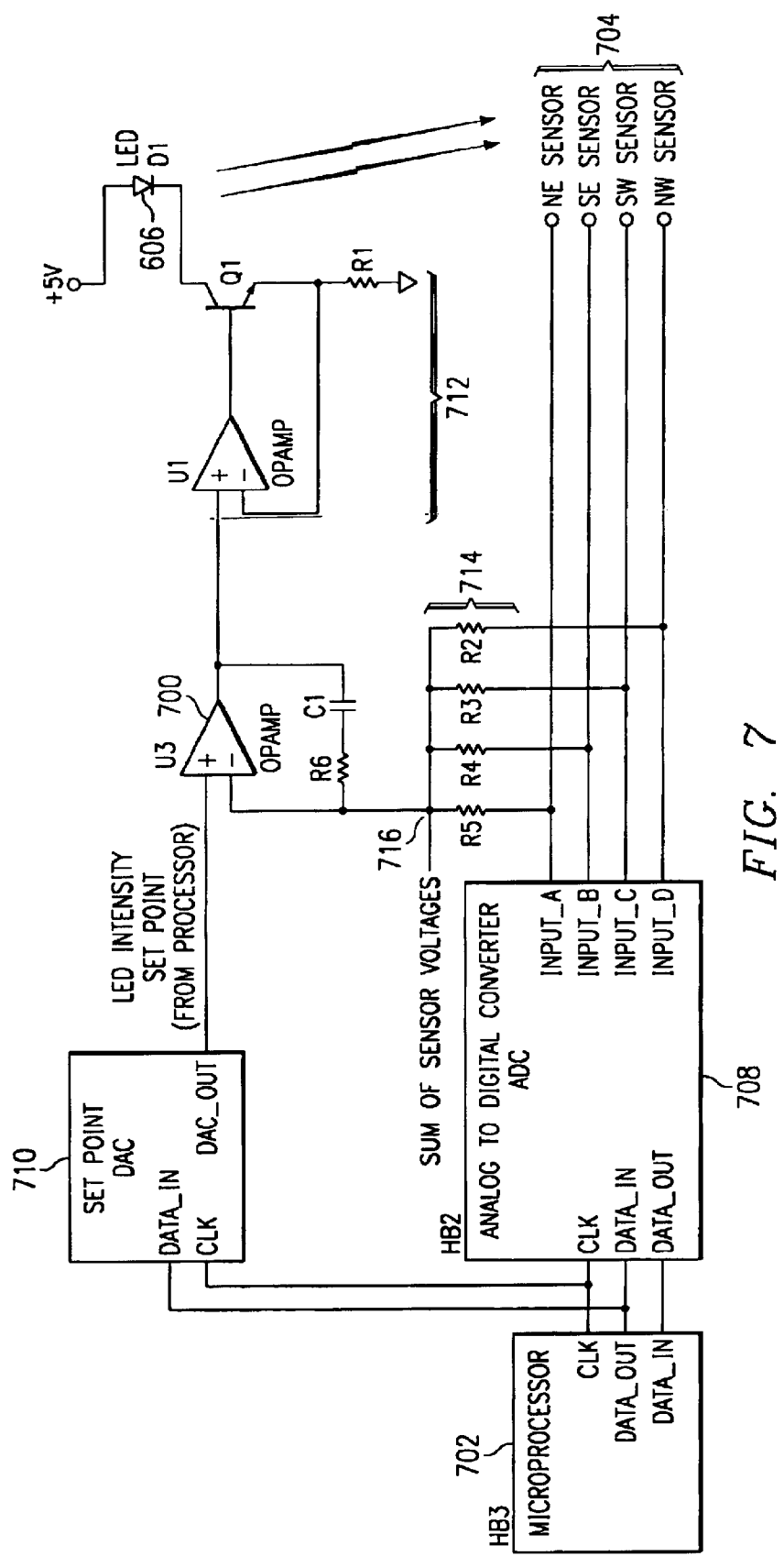
FIG. 7 is a schematic of a position control apparatus with dedicated circuit-based position sensor compensation.

With reference now to FIG. 7, there is shown a circuit block diagram in which the sensor compensation is performed by analog circuitry, in particular loop compensation amplifier 700. Here again, because the position calculation itself does not need to compensate for sensor drift, the voltage difference calculations performed by processor 702 may be the same ones as described hereinabove for the uncompensated case:

$PosX=(V_{NE}+V_{SE}-V_{SW}-V_{NW})*GainX+OffsetX$ $PosY=(V_{NE}-V_{SE}-V_{SW}+V_{NW})*GainY+OffsetY$ Processor 702 may use this information to correct for position errors, sending revised position commands to the actuator (shown in FIG. 5).

As with the previous embodiment, sensors 704 generate analog voltages representative of the light received from LED 606, which light varies as the mirror is rotated. The analog voltages are converted to digital signals by ADC 708, and provided to processor 702 for the position calculations.

With respect to sensor drift compensation, instead of processor adjusting the setpoint for sensor compensation, processor 702 preferably sets the LED intensity setpoint during a calibration routine and then holds it at that value. Alternatively, processor 702 may periodically adjust the setpoint. Processor 702 sends a digital intensity setpoint to setpoint DAC 710, which converts the digital signal into an analog voltage signal. The voltage signal is sent to loop compensation amplifier 700, which performs the setpoint adjustment to compensate for sensor drift. As with the previous embodiment, the adjusted setpoint is sent to LED drive circuit 712, which converts the voltage signal into a current signal that drives LED 706.

Loop compensation amplifier 700 receives the desired setpoint from processor 702, and compares that value to the voltage sum received from sensors 704. The voltage sum is generated by summing the currents through input resistors 714 at summing junction 716. The voltage sum at summing junction 716 is provided to the negative input of amplifier 700, while the setpoint output from DAC 710 is provided to the positive input of amplifier 700. Amplifier 700 will either increase or decrease its output depending on whether the sum of the four sensor outputs is less than or greater than the processor setpoint, respectively. Loop compensation amplifier 700 thus continuously adjusts the LED drive current to make the sensor voltage sum equal to the set point voltage from the processor.

Figure 8:
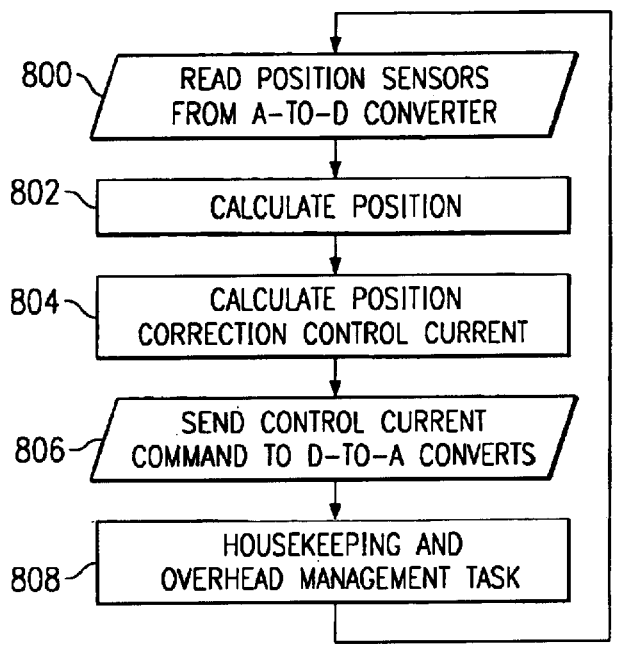
FIG. 8 is a high-level flow chart of the operation of the apparatus of FIG. 5.

With reference now to FIG. 8, there is shown a high level flowchart showing the servo control operation of the position control apparatus of FIG. 5. Generally, each servo sample time, the processor reads the voltages from the four sensors provided via the ADC, as shown in block 800. In step 802, the processor calculates the position of the actuator using the difference equations described hereinabove. The processor then performs calculations to determine the command values to send to the mirror to move it to a desired position in step 804. These commands may be sent to the actuator via the DAC in step 806. Other non-time critical tasks, such as housekeeping and overhead management, may be performed in step 808.

Generally, the time between step 800, reading the sensors to determine actuator position, and step 806, commanding the actuator to a desired position, is time critical. A long delay in this time period may interfere with responsive and stable actuator control. Therefore, in a preferred embodiment, the processor calculates the sum of the sensor output voltages in step 808. The processor may also perform the sensor voltage sum to LED intensity setpoint comparison in step 808, along with sending a new intensity setpoint to the LED. In an alternative embodiment, because a division operation is not required, the processor may perform the both the sensor voltage summation and the sensor voltage sum to LED intensity setpoint comparison within the time critical sensor read-actuator command time period. In another alternative embodiment, one of these steps may be performed within the time critical time period while the other step is performed during the non-time critical time period. In addition, it should be understood to one of ordinary skill in the art that the order of the steps in FIG. 8 may be altered and still remain within the scope of the present invention.

In an analog circuit preferred embodiment, the processor may only set the initial LED intensity setpoint (or may only periodically update the LED intensity setpoint), with a loop compensation amplifier providing compensation for sensor drift. In this embodiment, the processor is generally not required to calculate the sum of the sensor output voltages, compare the sum to the LED intensity setpoint, or adjust the setpoint because the analog loop may perform all of these functions. The processor will still generally read the sensor voltage outputs for controlling actuator position, but it does not need to perform any intensity specific calculations. In addition, an analog embodiment may allow a coarser, less expensive DAC to be used for holding the set point from the processor because the analog circuitry may provide any fine adjustments to the set point.

Figure 9:
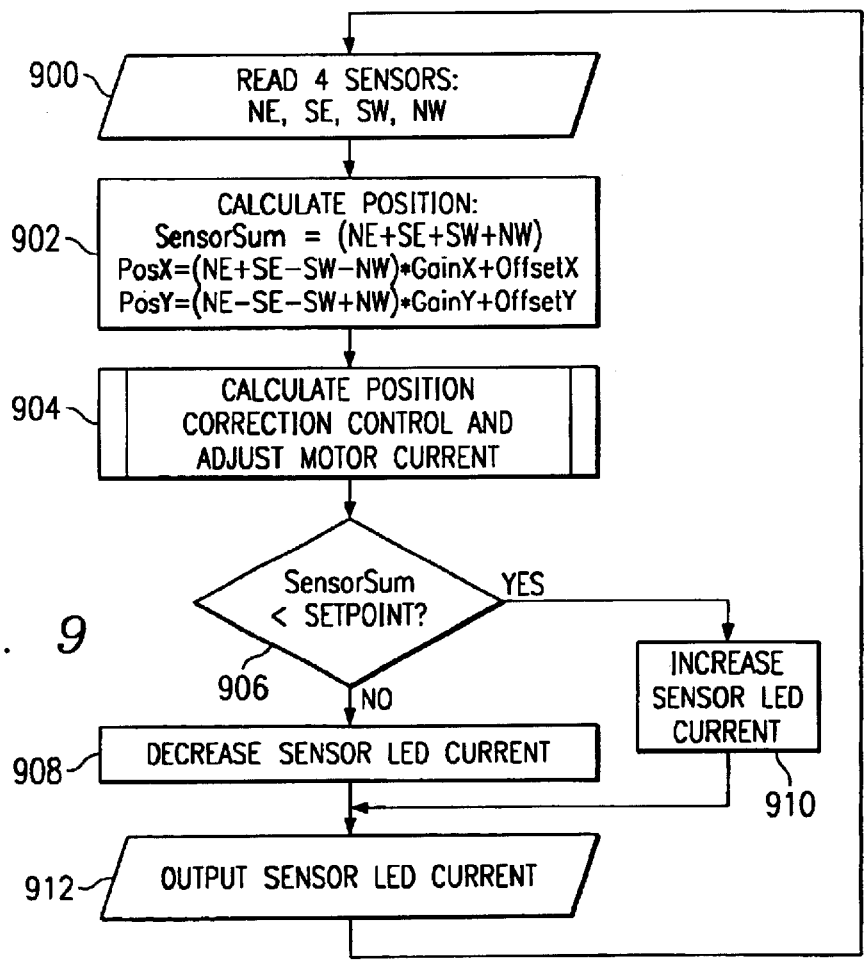
FIG. 9 is a detailed flow chart of the operation of the apparatus of FIG. 5.

With reference to FIG. 9, there is shown a flowchart for a processor-implemented embodiment with expanded detail for the sensor intensity control. As described hereinabove, the processor reads the four sensor inputs in step 900, calculates actuator position in step 902, and adjusts actuator actual position based on the measured position in step 904. The processor then compares the sum of the sensor voltages to the setpoint in step 906. If the sum is greater than the setpoint, the processor decreases the setpoint in step 908. If the sum is less than the setpoint, the processor increases the setpoint in step 910. The processor then provides the new setpoint to the DAC for adjusting the LED current in step 912.

In an analog embodiment, steps 906, 908, 910 and 912 would not be needed in the processor algorithm because these steps would be performed by the analog loop compensation circuitry. In addition, the sum of the sensor voltages may not need to be calculated by the processor if it is only used for intensity control. Again, it should be understood to one of ordinary skill in the art that the order of the steps in FIG. 9 may be altered and still remain within the scope of the present invention. For example, the sensor voltage sum calculation may be performed after the actuator position command is generated.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, firmware, analog circuitry, digital circuitry, or a combination thereof. As another example, it will be readily understood by those skilled in the art that the number and location of LEDs and sensors may be varied while remaining within the scope of the present invention. In addition, specific circuit or algorithm implementations may be changed while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of compensating for position sensor drift in a micromirror device, the method comprising:

providing a light intensity level signal to a light source;

directing light proportional to the light intensity level signal at an underside of a micromirror;

detecting light reflected from the underside of the micromirror with a plurality of photodetectors;

generating voltage signals representative of the reflected light detected with the plurality of photodetectors;

summing the voltage signals to generate a voltage sum;

comparing the voltage sum to a light intensity setpoint; and adjusting the light intensity level signal based on the voltage sum to light intensity setpoint comparison.

2. The method of claim 1, further comprising:

determining an orientation of the micromirror from the voltage signals; and orienting the micromirror by selectively energizing a plurality of driver elements.

3. The method of claim 2, wherein the comparing and adjusting steps are performed after the determining an orientation and orienting steps.

4. The method of claim 1, wherein the comparing step further comprises determining if the voltage sum is less than or greater than the intensity setpoint.

5. The method of claim 4, wherein the adjusting step further comprises increasing the intensity level signal if the voltage sum is less than the intensity setpoint, and decreasing the intensity level signal if the voltage sum is greater than the intensity setpoint.

6. A micro-electromechanical apparatus having position sensor compensation, the apparatus comprising:

an actuator element;

a light source for illuminating a portion of the actuator element;

a plurality of detectors for detecting a light intensity from the light source after reflection from the portion of the actuator element, wherein the light intensity detected at the plurality of detectors is representative of an orientation of the actuator element; and control circuitry for sending an intensity level signal to the light source and for receiving voltage signals from the plurality of detectors proportional to the intensity of the detected light, wherein the control circuitry comprises a summer for adding the voltage signals to generate a voltage sum, and a comparator for comparing the voltage sum to an light intensity setpoint, and wherein the control circuitry adjusts the intensity level signal based on the voltage sum to light intensity setpoint comparison.

7. The micro-electromechanical apparatus of claim 6, wherein the summer in the control circuitry comprises an analog summing junction resistively coupled to the voltage signals from the detectors, and wherein the comparator comprises a loop compensation amplifier receiving the voltage sum from the summing junction, receiving the light intensity setpoint, and outputting the intensity level signal to light source.

8. The micro-electromechanical apparatus of claim 7, further comprising a light source drive circuit disposed between the loop compensation amplifier and the light source.

9. The micro-electromechanical apparatus of claim 1, further comprising:

a plurality of driver elements for orienting the actuator element; and position control circuitry, coupled to the plurality of detectors and the plurality of driver elements, for applying an analog position command to the driver elements responsive to the detected orientation of the actuator element.

10. The micro-electromechanical apparatus of claim 9, the position control circuitry further comprising:

an ADC coupled to the detectors for converting the voltage signals to digits voltage signals;

a DSP coupled to the ADC for receiving the digital voltage signals and outputting a digital position command; and a position DAC coupled to the DSP for receiving the digital position command and outputting the digital position command to the driver elements.

11. The micro-electromechanical apparatus of claim 6, wherein the control circuitry comprises a digital signal processor (DSP), and wherein the summer, comparator and intensity level adjustment are implemented in code executing in the DSP.

12. The micro-electromechanical apparatus of claim 11, further comprising:

an analog to digital converter (ADC) disposed between the detectors and the DSP; and an intensity control digital to analog converter (DAC) disposed between the DSP and the light source.

13. The micro-electromechanical apparatus of claim 12, further comprising a light source drive circuit disposed between the intensity control DAC and the light source.

14. A micromirror apparatus having position sensor compensation, the apparatus comprising:

a mirror element;

a light source for illuminating a portion of an underside of the mirror element;

a plurality of detectors outputting voltage signals representative of a light intensity detected from the light source after reflection from the underside of the mirror element, wherein the voltage signals are representative of an orientation of the mirror element; and sensor control circuitry for sending a light intensity signal to the light source and for receiving the voltage signals from the plurality of detectors, wherein the control circuitry comprises a summer for adding the voltage signals to generate a voltage sum, and a comparator for comparing the voltage sum to an light intensity setpoint, and wherein the control circuitry adjusts the light intensity signal based on the voltage sum to light intensity setpoint comparison.

15. The micromirror apparatus of claim 14, further comprising:

at least one permanent magnet disposed on the mirror element;

a plurality of coil drivers, in proximity to the at least one permanent magnet, for orienting the mirror element; and position control circuitry, coupled to the plurality of detectors and the plurality of coil drivers, for applying an analog position command to the coil drivers responsive to the detected orientation of the mirror element.

16. The micromirror apparatus of claim 15, the position control circuitry further comprising:

an ADC coupled to the detectors for converting the voltage signals to digital voltage signals;

a DSP coupled to the ADC for receiving the digital voltage signals and outputting a digital position command; and a position DAC coupled to the DSP for receiving the digital position command and outputting the analog position command to the coil drivers.

17. The micromirror apparatus of claim 16, wherein the sensor control circuitry comprises an intensity control DAC disposed between the DSP and the light source.

18. The micromirror apparatus of claim 17, wherein the sensor control circuitry further comprises a light source drive circuit disposed between the DAC and the light source.

19. The micromirror apparatus of claim 18, wherein the sensor control circuitry also comprises the DSP, wherein the summer, comparator and intensity level adjustment are implemented in code executing in the DSP, and wherein the DAC is an intensity control DAC.

20. The micromirror apparatus of claim 18, wherein the intensity control DAC is a setpoint DAC, wherein the summer in the control circuitry comprises an analog summing junction resistively coupled to the voltage signals from the detectors, and wherein the comparator comprises a loop compensation amplifier receiving the voltage sum from the summing junction, receiving the light intensity setpoint from the setpoint DAC, and outputting the intensity level signal to the light source.

* * * * *